Jan. 11, 1927.
C. H. THIMME
1,614,050
METHOD OF PRODUCING TITLES AND INSCRIPTIONS FOR MOTION PICTURE FILMS
Filed Nov. 8, 1924
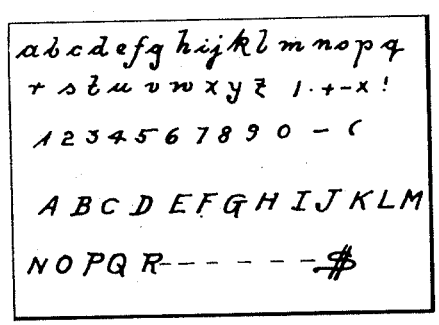
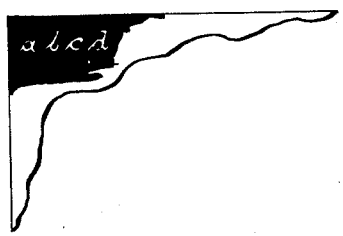
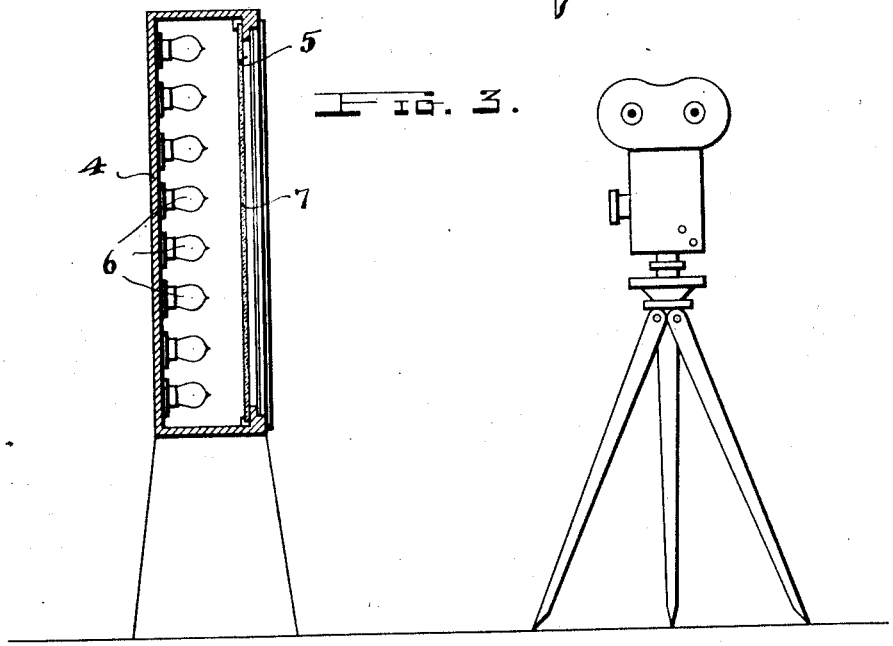
INVENTOR:
CHARLES H. THIMME,
By: Otto H. Krueger,
his Atty.

Patented Jan. 11, 1927.

1,614,050

UNITED STATES PATENT OFFICE.

CHARLES H. THIMME, OF HOLLYWOOD, CALIFORNIA.

METHOD OF PRODUCING TITLES AND INSCRIPTIONS FOR MOTION-PICTURE FILMS.

Application filed November 8, 1924. Serial No. 748,760.

This application is a continuation in part of my original application for a process for photographing motion picture titles, filed May 18, 1920, Serial No. 382,321, and another application divided from the original application, the divisional application having been filed September 20, 1922, Serial No. 589,360.

The invention relates to processes of producing titles and inscriptions upon motion picture films.

One of the objects of this invention is to reduce the time, labor, and expense of producing such titles and inscriptions.

Another object is to produce the titles and inscriptions in the handwriting of certain artists though not requiring the artists to produce the particular titles and inscriptions.

Another object is to produce clear and sharp titles and inscriptions.

Another object is to produce clear and sharp titles and inscriptions from individual character-displaying blocks, assembled and arranged into desired titles and inscriptions.

Another object is to produce titles and inscriptions by directly illuminated characters instead of by light-reflection upon the face or surface of the character-displaying bodies.

Other objects will appear from the following description and appended claims as well as from the accompanying drawing, in which—

Fig. 1 is a face illustration of a master sheet, displaying an alphabet supposed to be in the style of handwriting of an artist eventually preferred by a certain motion picture firm or producer.

Fig. 2 is a perspective view of a detail character-displaying body.

Fig. 3 is a side elevation of an arrangement partly in section, illustrating the manner in which titles and inscriptions are produced upon the motion picture films.

Fig. 4 is a fragmentary face illustration of a master-sheet, displaying a few letters of an alphabet supposed to be in the style of handwriting of an artist preferred by a certain motion picture firm or producer, being a slightly modified form over the illustration in Fig. 1 inasmuch as white letters on an opaque back-ground have been used in this slightly modified form instead of the black or opaque letters on a white back-ground.

The illustrations in the drawing are merely used in this specification to make the different steps in the process easily understood. Certain details and structures referred to in this specification are more fully described in the co-pending application, filed May 18, 1920, Serial No. 382,321, and it wil easily be understood that no specific details or structures are referred to in this application. and that other modified forms may be used as long as a producing of titles in accordance with this application can be accomplished.

It must be particularly understood that the letter-types or characters illustrated in the drawing are the products of a draftsman, while the real letters or characters to be used in connection with or under this process are intended to be in the handwriting of, or of a form produced by an artist or by a person decided upon or preferred by a motion picture producer.

In producing motion pictures, it is desirable to interpose upon the film, in appropriate places between and ahead of the pictures, titles, inscriptions, identification and other marks, pertaining to and explaining the pictures.

Heretofore, it has been customary to produce such titles and inscriptions by hand-lettering or printing the titles and inscriptions in white ink upon a black card, and then photographing the card with light reflected upon the face or surface thereof.

Such photographing is done successively, in a similar manner as followed in producing the pictures, by passing the film through the motion picture camera, having the camera pointed towards the illuminated card.

This method of procuring a card for each individual title or inscription, eventually hand-written by a certain and preferred artist, is not only expensive and slow, but sometimes unobtainable at the moment when a picture film is in a condition and ready for developing. Many titles and inscriptions are sometimes required for a single picture film, and an artist is not always in a position to handle or produce the large volume of work required in the comparatively short time allowed for such work. Help employed at such a moment is not able to produce the exact and equal lettering of the artist, and the titles and inscriptions, eventually thus produced, are not satisfactory to exacting film producers.

To mechanically produce the desired lettering or titling in accordance or agreement with this invention, it is, of course, not essential that the master sheet is produced in white ink upon a black back-ground, since it may also be made useful if written in black ink on a white back-ground, but it is preferable to have such a master-sheet produced with the characters in white ink upon a black back-ground since all the machinery and the necessary appliances of a motion picture plant have commonly been designed to produce a desired effect along such lines as to start with white characters on a dark back-ground.

Of course, it would only mean a slight alteration in the process or production of the picture films, to start with black or dark characters on a white back-ground, and the results can be made to be the same as those that may be produced from master-sheets having white characters on a dark back-ground.

The industry is equipped to use and manufacture from the master-sheets with characters in white ink on a dark background, and it is therefore preferable that any new process is developed along the same lines. There is a certain advantage to start with white characters on a dark back-ground in that the products are clearer than if they were produced from a master-sheet having black letters on a white back-ground.

By procuring the desired lettering, characters, or marks, on individual bodies, blocks, or small cards, to be assembled and arranged into various titles and inscriptions, the motion picture industry is made more independent of individual artists, and is enabled to produce and finish the films at its own convenience.

It has furthermore been established that titles and inscriptions have a superior clearness and sharpness when produced from transparent cards with the light behind the cards instead of reflecting light upon the face or surface of the cards. Whether the back-ground or the lettering is transparent is immaterial. However, the individual character-holding or displaying bodies must be arranged so closely that no light can penetrate around the bodies, to avoid a blurring of the surface, the transparent portions of the character-displaying bodies alone are rendered luminous by the light placed behind the whole assembled group forming the title or inscription.

The character-displaying bodies are therefore preferably arranged in the front side of a light-encloisng chamber or compartment, in order to allow a shutting off of the light used for the illumination of the assembled titles and inscriptions, and the edges of the individual character-displaying bodies are formed to seal one against the other thus forming a solid front for the light-enclosing chamber.

In Fig. 3, a box-like structure is illustrated, the otherwise fully closed receptacle 4 being provided with an opening 5. Illuminating lights 6 are disposed at suitable points within the receptacle. A diffusing sheet 7 is disposed in the opening 5, to produce an even illumination of displayed characters. The diffusing sheet, of course, can be made of different material, as of ground glass, or even tracing cloth. If no diffusing sheet is used, the lights appear normally in spots through the transparent plates, which is not at all desirable, since the lettering or characters in a title would not be clear, sharp, and evenly bright.

Assembling and arranging a required number of character-displaying bodies, in form of a desired title or inscription, in front of the diffusing sheet in the opening of the illuminated receptacle, the character-displaying bodies engaged closely one against the next one, and the opening covered in such a manner that only the desired characters appear illuminated through the front, serves to render the assembled title or inscription luminous and thereby very suitable for photographing.

The photographing is best accomplished in a dark room, so that no other lights can interfere with the photographing.

A single master sheet, in form of an alphabet or an array of characters and marks, can easily be procured in the type or handwriting of a preferred artist. The first expense of such a master sheet would be negligible compared with the expense and trouble when a great amount of titles and inscriptions are to be produced and procured at the finishing of a picture film.

Having a master sheet of lettering, characters, and marks, of a desired type, such a sheet is photographically reproduced a suitable number of times upon sensitized material, either, again in sheet or in plate form; or the single and individual letters, characters, and marks, of the master sheet upon individual pieces or bodies of sensitized material. If individual bodies of sensitized material for the individual characters are used, the individual bodies can, of course, be ready to be assembled side by side in order to form a solid, partly transparent surface in the manner described above. Reproducing the whole master sheet upon a sheet of sensitized material, this sheet, after being exposed and developed, is cut to sizes to display individual characters or a group of desired and frequently used characters in suitable forms of combinations. The edges of the individual pieces are formed and machined to engage so that no light can pass through when individual pieces are placed side by side into the assembly of a title or inscription. In Fig. 2, the individual character-displaying body is illustrated with V-shaped edges, so that adjoining bodies can engage with their edges, but it will easily be understood that the particular form or shape of the edges is immaterial, and that various forms can be provided without departing from the principles of this invention.

The main points of this invention are to procure a master sheet of desired characters from a person, artist or other preferred by a motion picture producer, photographically reproducing or producing the characters upon sensitized material, producing individual characters out of the groups of photographically reproduced or produced characters of a form to be easily arranged into titles and inscriptions for motion picture films, illuminating such arranged and assembled titles and inscriptions to be photographically reproduced upon the motion picture film, interposed in appropriate places between the pictures.

In this manner, the very personal handwriting of any preferred artist may be used in titling a motion picture film though the artist does not have to be bothered with writing or lettering any of the titles.

The individual photographically reproduced letters or characters can, of course, be on a thin film, the film to be applied to suitable blocks or bodies of a thickness and form to make them suitable to be assembled in the manner described above.

Having suitable characters, thus reproduced, arranged in form of a desired title, in front of a light-inclosing compartment, the whole presents the effect of luminous white letters on a black ground, if the letters were reproduced transparent on the face of the individual bodies.

Having thus described my invention, I claim:

1. In making a motion picture film, the herein described method, consisting in providing titles, inscriptions and the like compiled from a master sheet of desired characters, photographically producing individual characters from such master sheet, assembling such characters into required titles, and photograpically reproducing such assembled titles upon the motion picture film.

2. In making a motion picture film, the method of producing titles, inscriptions and the like which consists in producing an assortment of preferred characters in form of a master sheet, making a number of negatives from such master sheet so as to produce several pieces of each of the characters in the assortment, then assembling required characters into a desired title, and then reproducing the assembled title upon the motion picture film.

3. In making a motion picture film, the method of producing titles and inscriptions which consists in producing an assortment of preferred characters, making a number of negatives of the whole assortment into transparent character-displaying bodies, then assembling the photographically produced transparent character-displaying bodies into a desired title, rendering the assembled title luminous, and then reproducing the luminous title upon the motion picture film.

4. In making a motion picture film, the method of producing titles and inscriptions which consists in producing an assortment of preferred characters, producing individual bodies of transparent material having individual characters of the assortment photographically produced thereon, then assembling the character-displaying bodies into a desired title so as to present the effect of a luminous title sheet when disposed in front of light, and then photographically reproducing such luminous title sheet upon the motion picture film.

5. In making a motion picture film, the method of producing titles and the like which consists in producing an assortment of preferred characters, photographically producing a number of individual character-displaying bodies from such assortment, then assembling the photographically produced character-displaying bodies into a desired title, and then impressing a film in a motion picture camera with the title in the normal manner of taking motion pictures.

6. In making a motion picture film, the method of producing titles and the like which consists in producing an assortment of preferred characters, photographically producing a number of individual character-displaying bodies from such assortment, then assembling the photographically produced character-displaying bodies into a desired title, rendering the assembled title luminous, and then impressing a film in a motion picture camera with the luminous title in the normal manner of taking motion pictures.

7. In making a motion picture film, the method of producing titles and the like which consists in producing an assortment of preferred characters, photographically producing a number of individual character-displaying bodies from such assortment, then assembling the character-displaying bodies into a desired title so as to present the effect of a luminous title sheet when disposed in front of light, and then impressing a film in a motion picture camera with such luminous title in the normal manner of taking motion pictures.

8. In making a motion picture film, the method of producing titles and the like which consists in producing a master sheet of desired characters, making a negative of the master sheet, making positive prints from the said negative in form of translucent individual character-displaying bodies, assembling such character-displaying bodies into a required title, and then photographically reproducing such assembled title upon a motion picture film.

In testimony that I claim the foregoing as my invention I have signed my name.

CHARLES H. THIMME.